United States Patent
Yang

(10) Patent No.: US 7,190,508 B2
(45) Date of Patent: Mar. 13, 2007

(54) METHOD AND STRUCTURE OF PATTERNING LANDING PAD STRUCTURES FOR SPATIAL LIGHT MODULATORS

(75) Inventor: Xiao Yang, Cupertino, CA (US)

(73) Assignee: Miradia Inc., Sunnyvale, CA (US)

( * ) Notice: Subject to any disclaimer, the term of this patent is extended or adjusted under 35 U.S.C. 154(b) by 51 days.

(21) Appl. No.: 11/154,847

(22) Filed: Jun. 15, 2005

(65) Prior Publication Data
US 2006/0285192 A1   Dec. 21, 2006

(51) Int. Cl.
G02B 26/00   (2006.01)

(52) U.S. Cl. .............. 359/291; 359/290; 359/223; 359/224

(58) Field of Classification Search ........... 359/290, 359/291, 223, 224, 238, 292; 345/207, 108
See application file for complete search history.

(56) References Cited

U.S. PATENT DOCUMENTS

| | | |
|---|---|---|
| 4,229,732 A | 10/1980 | Hartstein et al. |
| 4,317,611 A | 3/1982 | Petersen |
| 4,566,935 A | 1/1986 | Hornbeck |
| 4,615,595 A | 10/1986 | Hornbeck |
| 5,061,049 A | 10/1991 | Hornbeck |
| 5,172,262 A | 12/1992 | Hornbeck |
| 5,311,360 A | 5/1994 | Bloom et al. |
| 5,382,961 A | 1/1995 | Gale, Jr. |
| 5,448,314 A | 9/1995 | Heimbuch et al. |
| 5,452,024 A | 9/1995 | Sampsell |
| 5,489,952 A | 2/1996 | Gove et al. |
| 5,504,614 A | 4/1996 | Webb et al. |
| 5,535,047 A | 7/1996 | Hornbeck |
| 5,583,688 A | 12/1996 | Hornbeck |
| 5,589,852 A | 12/1996 | Thompson et al. |
| 5,600,383 A | 2/1997 | Hornbeck |
| 5,661,591 A | 8/1997 | Lin et al. |
| 5,663,749 A | 9/1997 | Farns et al. |
| 5,742,419 A | 4/1998 | Dickensheets et al. |

(Continued)

FOREIGN PATENT DOCUMENTS

EP   1237032 A2   9/2002

(Continued)

OTHER PUBLICATIONS

Henley et al., "A New SOI Manufacturing Technology Using Atomic layer Cleaving." Silicon Genesis Corporation Campbell CA. pp. 1-5.

(Continued)

*Primary Examiner*—Timothy Thompson
(74) *Attorney, Agent, or Firm*—Townsend and Townsend and Crew LLP

(57) ABSTRACT

A spatial light modulator. The spatial light modulator includes a first substrate and a standoff structure coupled to the first substrate. The spatial light modulator also includes a mirror structure coupled to the standoff structure. The mirror structure includes a mirror body comprising at least one edge region and at least one end region, a reflective layer coupled to the mirror body, and a flexible member coplanar with the mirror body. According to an embodiment of the present invention, the mirror structure rotates about the flexible member to an activated position. In the activated position, the at least one edge region of the mirror body makes contact with the standoff structure while maintaining the at least one end region free from contact with the first substrate.

15 Claims, 10 Drawing Sheets

U.S. PATENT DOCUMENTS

| | | | |
|---|---|---|---|
| 5,757,536 | A | 5/1998 | Rioco et al. |
| 5,793,519 | A | 8/1998 | Furlani et al. |
| 5,835,256 | A | 11/1998 | Huibers |
| 5,885,468 | A | 3/1999 | Kozlowski |
| 5,939,171 | A | 8/1999 | Biebl |
| 5,999,306 | A | 12/1999 | Atobe et al. |
| 6,038,056 | A | 3/2000 | Florence et al. |
| 6,046,840 | A | 4/2000 | Huibers |
| 6,049,317 | A | 4/2000 | Thompson et al. |
| 6,127,756 | A | 10/2000 | Iwaki et al. |
| 6,172,797 | B1 | 1/2001 | Huibers |
| 6,201,521 | B1 | 3/2001 | Doherty |
| 6,252,277 | B1 | 6/2001 | Chan et al. |
| 6,285,490 | B1 | 9/2001 | Meier et al. |
| 6,323,982 | B1 | 11/2001 | Hornbeck |
| 6,337,760 | B1 | 1/2002 | Huibers et al. |
| 6,356,378 | B1 | 3/2002 | Huibers |
| 6,388,661 | B1 | 5/2002 | Richards |
| 6,396,619 | B1 | 5/2002 | Huibers et al. |
| 6,429,033 | B1 | 8/2002 | Gee et al. |
| 6,529,310 | B1 | 3/2003 | Huibers et al. |
| 6,538,800 | B2 | 3/2003 | Huibers |
| 6,542,653 | B2 | 4/2003 | Wu et al. |
| 6,543,286 | B2 | 4/2003 | Garverick et al. |
| 6,809,852 | B2 | 10/2004 | Tao et al. |
| 6,820,988 | B2 | 11/2004 | van Drieenhuizen |
| 6,827,866 | B1 | 12/2004 | Novotny |
| 6,856,068 | B2 | 2/2005 | Miller et al. |
| 6,891,654 | B2 | 5/2005 | Kurosawa et al. |
| 6,891,655 | B2 | 5/2005 | Grebinski et al. |
| 2002/0041455 | A1 | 4/2002 | Sawada et al. |
| 2002/0071166 | A1 | 6/2002 | Jin et al. |
| 2002/0071169 | A1 | 6/2002 | Boweres et al. |
| 2002/0132389 | A1 | 9/2002 | Patel et al. |
| 2003/0117686 | A1 | 6/2003 | DiCarlo |
| 2003/0207487 | A1 | 11/2003 | Kubena et al. |
| 2004/0000696 | A1 | 1/2004 | Ma et al. |
| 2004/0004753 | A1 | 1/2004 | Pan |
| 2004/0008402 | A1 | 1/2004 | Patel et al. |
| 2004/0125347 | A1 | 7/2004 | Patel et al. |
| 2004/0136044 | A1 | 7/2004 | Miller et al. |
| 2004/0184133 | A1 | 9/2004 | Su et al. |
| 2004/0190817 | A1 | 9/2004 | Aubuchon |
| 2005/0041277 | A1 | 2/2005 | Huibers |

OTHER PUBLICATIONS

Petersen, K.E., Micromechanical Light Modulator Array Fabricated On Silicon. Applied Physics Letters. Oct. 15, 1977, pp. 521-523, vol. 31 No. 8.

Petersen, K.E., Micromechanical Membrane Switches On Silicon. IBM J. Res. Develop., Jul. 1979, pp. 376-385. vol. 23, No. 4.

METHOD AND STRUCTURE OF PATTERNING LANDING PAD STRUCTURES FOR SPATIAL LIGHT MODULATORS

BACKGROUND OF THE INVENTION

This present invention relates generally to manufacturing objects. More particularly, the invention relates to a method and structure for fabricating one or more landing pads for spatial light modulators. Merely by way of example, the invention has been applied to the formation of a landing pad structure fabricated from a dielectric layer coupled to a standoff structure. The method and device can be applied to spatial light modulators as well as other devices, for example, micro-electromechanical sensors, detectors, and displays.

Micro-electromechanical systems (MEMS) are used in a number of application areas. For example, MEMS have been used in micro-mirror arrays, sensors, and actuators. In some of these applications, a suspended member is attracted to an electrode upon application of an electrical force and restored to an original position by a restoring force. As the suspended member approaches the electrode, surface forces can exert influences on the MEMS. These surface forces are sometimes referred to as "stiction" forces, since in some MEMS, parasitic forces arise from a combination of MEMS components sticking together and from friction, thus the term stiction. These parasitic forces may be strong enough to overcome the restoring force, resulting in an undesirable adhesion of the suspended member to the electrode.

As merely an example, conventional MEMS have relied upon a variety of techniques to overcome such stiction forces. For example, certain devices have relied upon the coating of MEMS components and the use of complex mechanical structures. Unfortunately, these techniques also have limitations. For example, some coatings are difficult to deposit on small components and can require complex deposition equipment. Moreover, complex mechanical structures may have reliability and lifetime concerns.

In response to certain of these issues, some MEMS architectures, in particular spatial light modulator architectures, have provided landing posts attached to micro-mirrors present in arrays. Landing posts serve to reduce the contact area between the suspended member and the electrode surface. However, as with other approaches, reliability and lifetime concerns may be present in these designs.

Thus, there is a need in the art for methods and apparatus for fabricating improved landing pad structures for spatial light modulators.

SUMMARY OF THE INVENTION

According to the present invention techniques for manufacturing objects are provided. More particularly, the invention relates to a method and structure for fabricating one or more landing pads for spatial light modulators. Merely by way of example, the invention has been applied to the formation of a landing pad structure fabricated from a dielectric layer coupled to a standoff structure. The method and device can be applied to spatial light modulators as well as other devices, for example, micro-electromechanical sensors, detectors, and displays.

According to a specific embodiment of the present invention, a spatial light modulator is provided. The spatial light modulator includes a first substrate. In some embodiments, the first substrate is a CMOS substrate including a number of electrically activated electrodes. The spatial light modulator also includes a standoff structure coupled to the first substrate. The standoff structure is fabricated from a dielectric layer, for example, silicon oxide in a particular embodiment according to the present invention. The spatial light modulator further includes a mirror structure coupled to the standoff structure.

The mirror structure includes a mirror body having at least one edge region and at least one end region. In some embodiments, multiple edge regions are provided with an end region located adjacent and between the multiple edge regions. The mirror structure also includes a reflective layer coupled to the mirror body. Moreover, the mirror structure includes a flexible member coplanar with the mirror body. In a specific embodiment, the flexible member is a torsion spring hinge. The mirror structure rotates about the flexible member to an activated position, the at least one edge region of the mirror body making contact with the standoff structure in the activated position while maintaining the at least one end region free from contact with the first substrate.

According to an alternative embodiment of the present invention, a method of fabricating a spatial light modulator is provided. The method includes providing a first substrate, the first substrate including a number of electrodes and a first bonding region. The method also includes forming a first layer coupled to the first bonding region, the first layer extending from the first bonding region to a first height. In some embodiments, the first layer is formed by depositing a dielectric layer such as silicon oxide on the first substrate. The method further includes patterning the first layer to form a contact structure. In a specific embodiment, the first layer is patterned using a photolithographically defined etch process.

The method additionally includes providing a second substrate comprising a device layer. In some embodiments, the second substrate is a silicon-on-insulator substrate including at least one layer of single crystal silicon. Moreover, the method includes patterning the device layer to form a standoff structure and a mirror layer. The spacer structure extends from the mirror layer to a second height. Furthermore, the method includes joining the contact structure of the first substrate and the spacer structure of the second substrate and removing a portion of the mirror layer to form a flexible member and a mirror plate. The mirror plate includes at least one edge region and at least one corner region. In some embodiments, the at least one edge region makes contact with the contact structure in an activated position while maintaining the at least one end region free from contact with the first substrate. In some embodiments, the flexible member is a torsion spring hinge adapted to support rotation of the mirror layer about the longitudinal axis of the hinge.

According to another specific embodiment of the present invention, an array of spatial light modulators is provided. The array includes an electrode substrate and a spacer structure with integrated contact pads coupled to the electrode substrate. The spacer structure generally includes a number of annular recesses. The array also includes a first set of electrodes disposed within a first annular recess of the spacer structure. The array further includes a first micro-mirror associated with the first set of electrodes, coupled to the spacer structure, and adapted to rotate about a first hinge to an activated position. In a specific embodiment, the first micro-mirror includes at least one first edge region and a first end region. the at least one first edge region makes contact with at least a first contact pad in the activated position while maintaining the first end region free from contact with the electrode substrate.

The array additional includes a second set of electrodes disposed within a second annular recess of the spacer structure and a second micro-mirror associated with the second set of electrodes, coupled to the spacer structure, and adapted to rotate about a second hinge to an activated position. The second micro-mirror includes at least one second edge region and a second end region. the at least one second edge region makes contact with at least a second contact pad in the activated position while maintaining the second end region free from contact with the electrode substrate.

Numerous benefits are achieved using the present invention over conventional techniques. For example, an embodiment of the present invention provides a means to simplify fabrication of spatial light modulator components. Additionally, embodiments of the present invention provide a flexible design that can be optimized to meet the needs of particular applications. For example, the size and position of landing pads may be modified depending on the design constraints presented by a given application. In addition, the flexibility of design extends to materials optimized for particular applications. In embodiments according to the present invention, complex coatings are not necessary to reduce parasitic forces present in the MEMS. In certain embodiments, the invention also provides a way of operating a MEMS device to overcome stiction forces. Depending upon the embodiment, one or more of these benefits may exist. These and other benefits have been described throughout the present specification and more particularly below.

Various additional objects, features, and advantages of the present invention can be more fully appreciated with reference to the detailed description and accompanying drawings that follow.

DETAILED DESCRIPTION OF SPECIFIC EMBODIMENTS

According to the present invention techniques for manufacturing objects are provided. More particularly, the invention relates to a method and structure for fabricating one or more landing pads for spatial light modulators. Merely by way of example, the invention has been applied to the formation of a landing pad structure fabricated from a dielectric layer coupled to a standoff structure. The method and device can be applied to spatial light modulators as well as other devices, for example, micro-electromechanical sensors, detectors, and displays.

Figure 1:
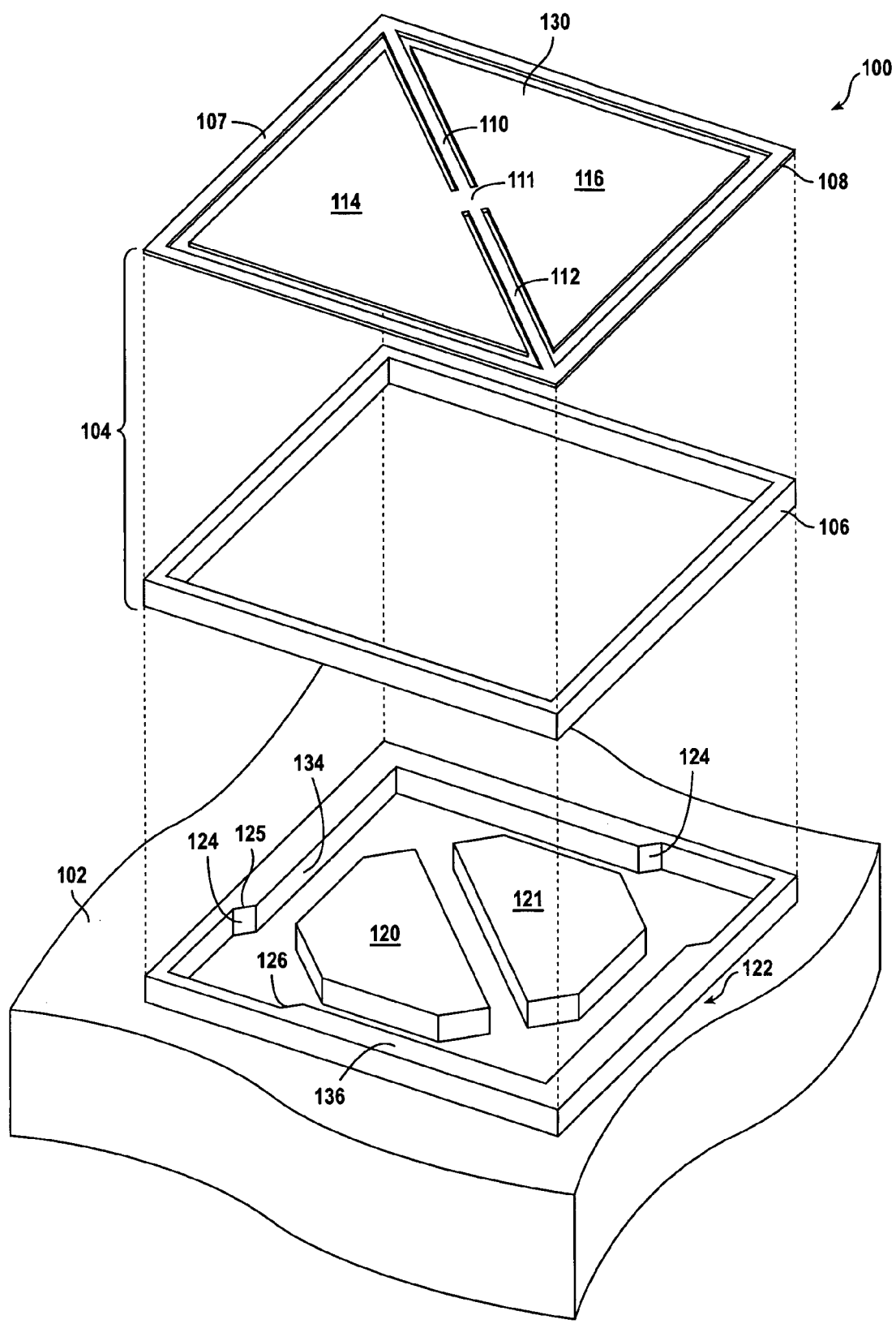
FIG. 1 is a simplified exploded perspective view of a spatial light modulator according to an embodiment of the present invention.

FIG. 1 is a simplified exploded perspective view of a spatial light modulator 100 according to an embodiment of the present invention. This diagram is merely an example, which should not unduly limit the scope of the claims herein. One of ordinary skill in the art would recognize many variations, modifications, and alternatives. The spatial light modulator includes an electrode substrate 102 and mirror substrate 104. For purposes of clarity, the mirror substrate 104 is presented in an exploded view in FIG. 1, a view in which a mirror spacer structure 106 (sometimes referred to as a mirror support frame) and a mirror layer 108 are spatially separated from each other. As will be discussed in additional detail below, in some embodiments according to the present invention, the mirror spacer structure 106 and the mirror layer 108 are fabricated using semiconductor fabrication technology from a single silicon substrate or wafer. Thus, the illustration of the "layers" as spatially separated is merely an aid for conceptualizing different portions of the spatial light modulator and is not intended to limit the claims herein.

Mirror layer 108 includes flexible members 110 and 112 coupled to an upper portion 107 of the mirror layer spacer structure 106. In a particular embodiment, the flexible members form a torsion spring hinge. Additionally, the mirror layer includes mirror plates 114 and 116 coupled to the flexible members by a connector 111. As illustrated in FIG. 1, mirror plates 114 and 116 are free to rotate about the longitudinal axis of the flexible member or hinge.

In a specific embodiment, the micro mirror plates 114 and 116, flexible members 110 and 112, connector 111, and mirror layer spacer structure 106 are fabricated from a wafer or substrate of a single material, such as single crystal silicon. Fabricating the mirror layer 104 out of a single material wafer greatly simplifies the fabrication of the mirror structure. Additional information related to spatial light modulators provided according to the present invention can be found in U.S. patent application Ser. No. 10/756,936, filed Jan. 13, 2004, commonly owned, and hereby incorporated by reference for all purposes.

As further illustrated in the figure, a first substrate 102 is provided. In the embodiment illustrated in FIG. 1, the first substrate is an electrode substrate comprising an integrated circuit device having a plurality of electrode devices 120. The integrated circuit device can include drive devices (not shown) coupled to each of the electrodes. In one application, the drive devices include CMOS circuitry fabricated in processing steps prior to the formation of the plurality of electrode devices 120. The drive devices can be used to apply voltages to the electrodes to actuate selected mirror devices present on the mirror substrate 104.

The first substrate 102 can be made of any suitable material. The suitable material generally has mechanical stability and an ability to be processed using semiconductor processing techniques. As merely an example, the material can be a semiconductor. Preferably, the first substrate is a silicon wafer, processed according to semiconductor processing techniques. Other materials may also be used in alternative embodiments according to the present invention.

Electrically activated electrodes 120 and 121 are coupled to the first substrate. The electrodes can be made of materials that conduct electricity. Merely by way of example, the electrodes in the embodiment according to the present invention illustrated in FIG. 1 are made of a metal preferentially deposited on the surface of the first substrate. Preferably, the electrode is made of a multilayer stack of deposited titanium nitride, aluminum, and titanium nitride layers. In alternative embodiments according to the present invention, the electrode is made of greater of lesser numbers of layers, which may include other suitable conductors, such as tungsten.

An electrode substrate standoff structure 122 with integrated landing pads 124 is also illustrated in FIG. 1. As described more fully below, the standoff structure 122 is formed in a specific embodiment by a deposition and patterning process conducted on a surface the electrode substrate. The dimensions of the standoff structure are selected to provide a suitable base for bonding of the mirror spacer structure and a predetermined distance between the electrode layer, the mirror layer 108, and the landing pads.

As illustrated in FIG. 1, the mirror plates 114 and 116 are connected to the flexible members 110 and 112 (e.g., forming a torsion spring hinge) by a connector 111. In a particular embodiment, the torsion spring hinge is connected to an upper portion of the mirror layer spacer structure or support frame 108, which holds the flexible members, the connector, and the mirror plates in place. Other springs, hinges and connection schemes among the mirror plates, the hinge, and the spacer support frame could also be used in alternative embodiments.

As illustrated in FIG. 1, the torsion hinge is preferably diagonally oriented (e.g., at a 45° angle) with respect to the mirror spacer structure, and divides the mirror plate into two parts, or sides: a first side 114 and a second side 116. Furthermore, two electrodes 120 and 121 are associated with the mirror, one electrode 120 for the first side 114 and one electrode 121 for the second side 116. This arrangement allows either side of the mirror to be attracted to one of the electrodes beneath the mirror plate. Thus, the mirror is able to pivot downward and provides a wide range of angular motion. In some embodiments, the torsion spring hinge allows the mirror plates to rotate relative to the spacer support frame about a longitudinal axis of the hinge when a force such as an electrostatic force is applied to the mirror plates by applying a voltage between the mirror layer and the corresponding electrode. This rotation produces an angular deflection for reflecting light in a selected direction.

In the embodiment illustrated in FIG. 1, a portion of the upper surface 130 of the mirror layer is a reflective surface. For example, the power reflectance of portions of upper surface of the mirror layer may be greater than or equal to 90%. The upper surface 130 is preferably a highly smooth surface, with a measure of roughness of less than 2 Å root mean square and preferably constituting a large proportion of the surface area of the mirror layer. In some embodiments, an aluminum or any other highly reflective material is deposited on the upper surface. Preferably, this reflective material has a thickness of 300 Å or less. The thinness of the reflective material deposited on the surface of the mirror layer ensures that it inherits the flat, smooth surface of the upper surface of the mirror layer.

In some applications, substrates 102 and 104 are joined to form a composite substrate structure including a number of spatial light modulators. Wafer bonding techniques are utilized to join the substrates and form a mechanical bond as will be evident to one of skill in the art.

Figure 2:
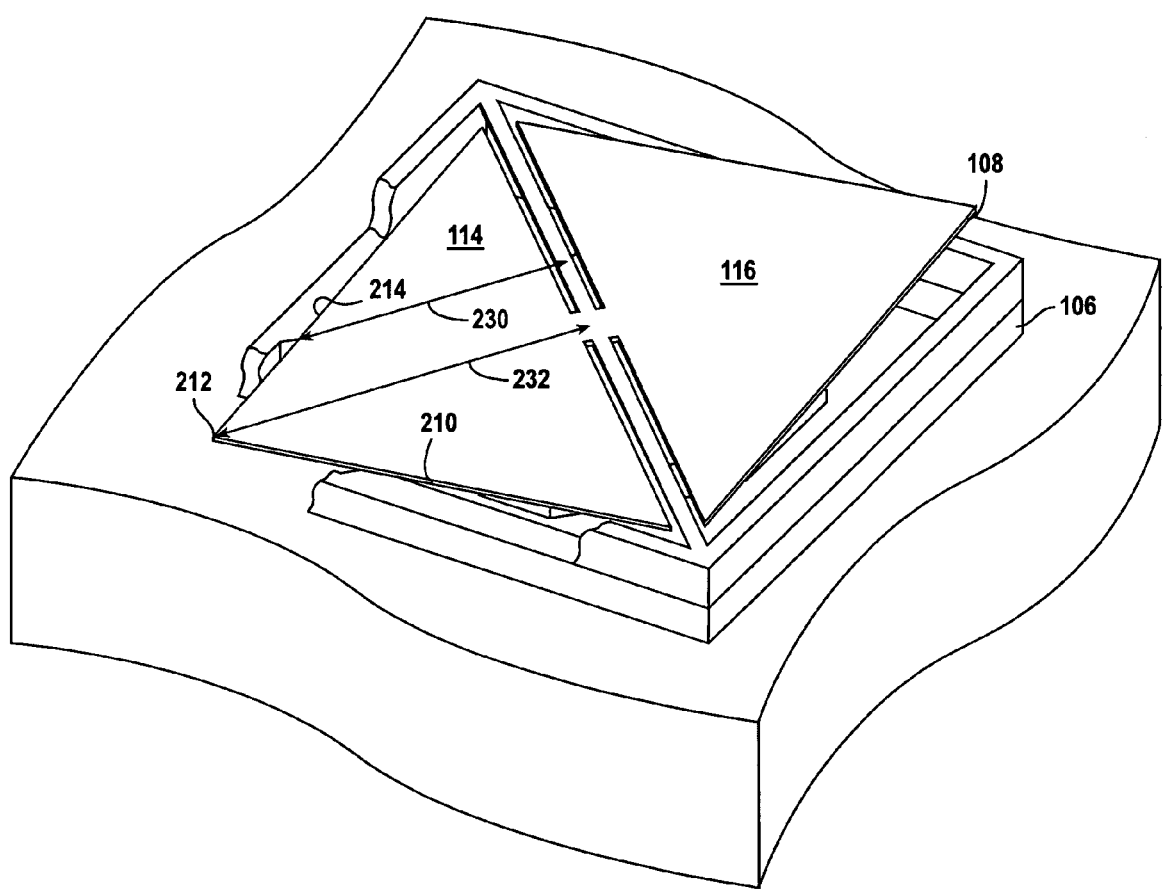
FIG. 2 is a simplified perspective view of a spatial light modulator in an activated state according to an embodiment of the present invention.

FIG. 2 is a simplified perspective view of a spatial light modulator in an activated state according to an embodiment of the present invention. Mirror plate 114 is tilted toward electrode 120 (see FIG. 1) and the mirror plate is positioned in an activated state. In the activated state, the mirror plate is adapted to reflect incident radiation at an angle differing from the angle at which incident light is reflected when the mirror plate is in an unactivated state (illustrated in FIG. 1). Referring to FIGS. 1 and 2, the deflection of the mirror plate is stopped by the landing structures 134 and 136. In a specific embodiment, the landing structure 136 comprises a landing pad or a landing contact 126 that is coupled to the standoff structure 122. As illustrated in FIG. 2, the mirror layer 108 is coupled to the mirror spacer structure 106 and comprises a mirror body or plate 114 and 116 including at least one edge region 210 and at least one end region 212. When the mirror layer rotates about the flexible member to the activated position, the edge region 210 of the mirror body makes contact with the standoff structure (e.g., the landing pads) at the landing contact 126. In the activated position, the end region 212 is maintained free from contact with the first substrate or elements coupled to the first substrate.

In some embodiments, as discussed above, a reflective layer is coupled to the mirror plate, enhancing the reflectivity of spatial light modulators incorporating such mirror plates. Additionally, as illustrated in FIG. 2, the flexible member 110 and 112 is coplanar with the mirror plate. Since the flexible member (e.g., a torsion spring hinge) and the mirror plates 114 and 116 are coplanar, the mirror moves about the flexible member in pure rotation with no translational displacement.

Furthermore, as illustrated in FIG. 2, the mirror plate 114 includes a second edge region 214. In the embodiment illustrated in FIG. 2, the second edge region is oriented at a right angle with respect to the first edge region. Of course, depending on the particular shape of the mirror plate, the orientation of the various edge regions with respect to each other will differ as one of skill in the art will appreciate. In the activated position, the second edge region makes contact with a second landing pad 124 while maintaining the end region free from contact with the first substrate. In some embodiments, the position of the landing pads is selected to provide for simultaneous contact between the two edge regions and their associated landing pads as the mirror plate transitions to the activated position.

Parasitic forces or stiction forces present in the vicinity of landing contacts 124 and 126, will attract the mirror plate toward the first substrate, opposing forces attempting to return the mirror plate to a horizontal state. If the mirror plate becomes pinned in the activated position illustrated in FIG. 2, it will not be able to transition between the unactivated and activated states, resulting in an undesirable condition.

In many MEMS applications, parasitic forces may exert an impact on system design and performance. The magnitude of the parasitic forces observed in a MEMS depends on a variety of factors. For example, if two portions of a MEMS are in contact with each other, a parasitic force dependent on the contact area may be present. In addition, the material used in the fabrication of the MEMS may impact the magnitude of the parasitic force. In some cases, the material dependence of the force is related to Van der Waals forces. As an additional example of the factors that can impact the magnitude of parasitic forces, an increase in the humidity of the MEMS environment typically increases the magnitude of the parasitic forces.

In a specific embodiment according to the present invention, the structure of spatial light modulator, including the placement of the landing pads in relation to the position of the mirror layer is selected to reduce parasitic forces, including stiction torques. Referring to FIG. 2, the distance 230 from the flexible member to the landing pads is a predetermined distance. As illustrated in the figure, the distance 230 is measured along a line perpendicular to the longitudinal axis of the flexible member. In the embodiment illustrated in FIG. 2, the distance from the flexible member to the landing pads is about 6.0 μm. Alternatively, the distance ranges from about 2.0 μm to about 8.0 μm in other embodiments. Of course, the distance from the flexible member to the landing pads will depend on the particular applications.

In some embodiments according to the present invention, the distance from the flexible member to the landing post is reduced to reduce the parasitic torque present at the flexible member. This parasitic torque is a function of the distance from the landing pads to the flexible member and the component of the parasitic force perpendicular to the mirror plate. This parasitic force present at the top of the landing pads acts on the mirror plate, generating a parasitic torque opposing the restoring torque provided by the flexible member. In comparison with a design in which the end region of the mirror plate makes contact with the first substrate, since the distance 230 is less than the distance 232 from the flexible member to the end region (equal in the embodiment illustrated in FIG. 2 to one half the diagonal dimension of the mirror body), the parasitic torque at the flexible member is reduced by the methods and systems provided by the present invention.

In embodiments according to the present invention, the height and position of the landing pads (among other elements) are selected so that the mirror plates are tilted at a predetermined angle with respect to the first substrate (or horizontal) when the mirror plates are in the activated position. In embodiments according to the present invention in which the mirror plates comprise an upper reflective surface, an incident ray of light will be reflected at predetermined angles depending on the tilt angle of the mirror plates. In the embodiment illustrated in FIG. 2, the height and position of the landing post are selected so that the mirror plates are tilted at an angle of 12° with respect to the horizontal in the activated position. Alternative embodiments have either increased or decreased tilt angles with respect to the horizontal depending on the particular application.

As illustrated in FIG. 1, in a particular embodiment, the structure of the landing pads is selected to further reduce stiction forces. As an example, the edges 125 and 126 of the landing pads are tapered in an embodiment to reduce the contact area between the landing pad and the mirror plate. Referring to FIG. 1 and mirror plate 114, if the landing pad structure 134 is formed so that the edge 125 extends along a line parallel to the longitudinal axis of the flexible member, in the activated state, the mirror plate will contact the landing pads along a line defined by the upper face of the contact structure 134 and the end face 124 of the landing pads. In this geometry, contact along the corner edge of the landing posts will distribute the contact pressure along a line defining the edge 125, but may result in increased stiction forces.

In some embodiments, the edge 125 of the landing pad structure is tapered to reduce the contact area. Merely by way of example, in a specific embodiment, the edge extends along a line extending from the end of the land pad structures toward the center of the mirror layer, for example, the connector 111. In this embodiment, the edge of the mirror plate and the edge of the landing pads intersect at a point when the mirror plate is in the activated state. The angle between the surfaces is selected to optimize system parameters, such as device reliability, magnitude of stiction forces, contact point pressure, and the like. In other embodiments, other taper angles, including along a line extending perpendicular to the longitudinal axis of the flexible member and intersecting the landing pads are utilized. Moreover, although FIGS. 1 and 2 illustrate edge 125 as a straight line, this is not required by the present invention. Other shapes, including curves are included within the scope of the present invention. One of ordinary skill in the art would recognize many variations, modifications, and alternatives.

Embodiments according to the present invention provide electro-mechanical mirror systems configured to controllably reflect incident optical radiation. However, the present invention is applicable to a broad class of electro-mechanical systems in which parasitic forces are present. For many electromechanical systems, proper device functionality necessitates incorporation of design elements directed at reducing the magnitude and impact of parasitic forces. For example, many MEMS features design elements directed at reducing stiction forces. Embodiments in accordance with the present invention reduce parasitic forces in this class of electromechanical systems and particularly in MEMS. Additional details of certain features of the present electro-mechanical system can be found in U.S. application Ser. No. 10/756,936, filed Jan. 13, 2004, commonly owned and incorporated by reference for all purposes.

Figure 3:
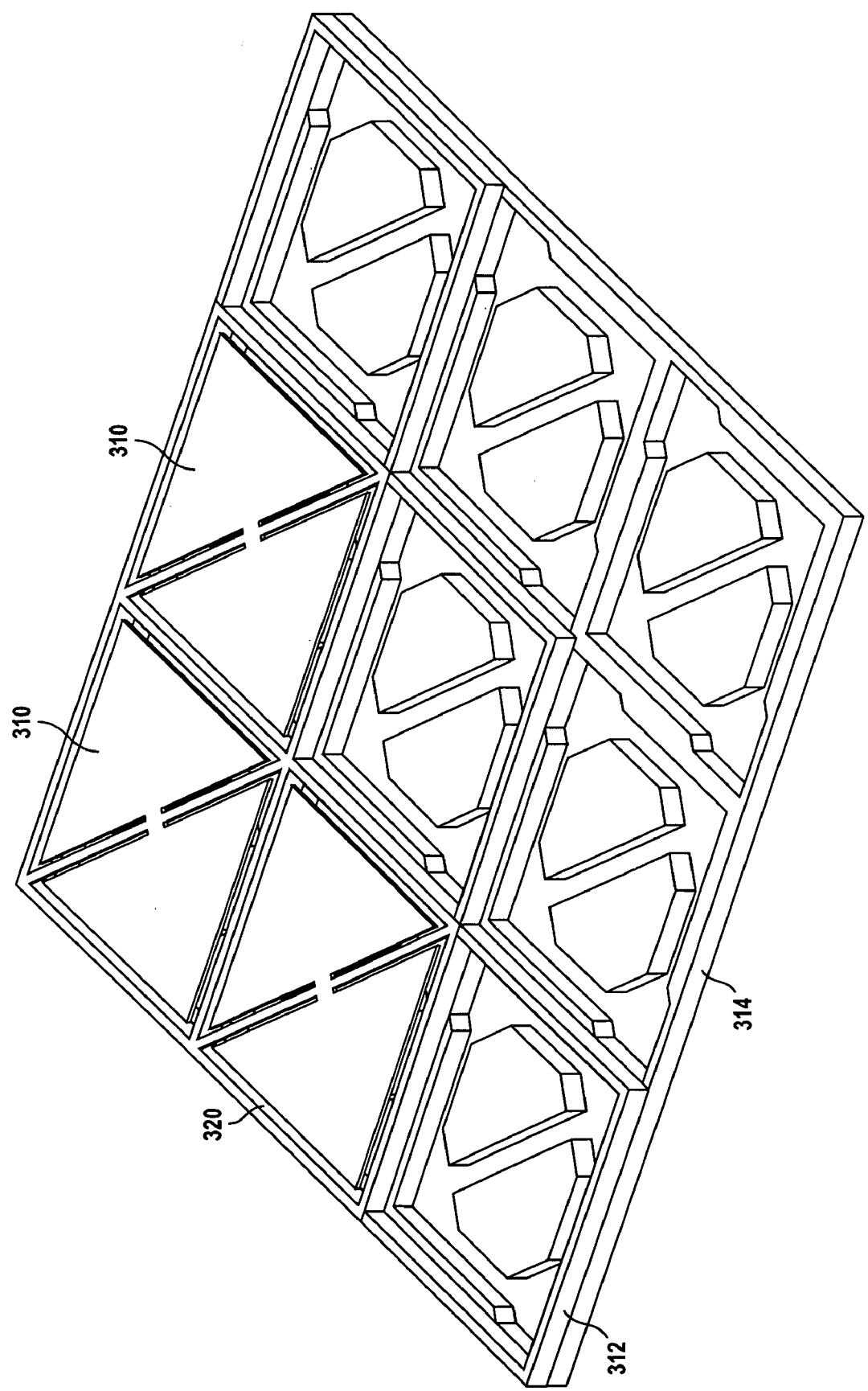
FIG. 3 is a simplified perspective illustration of an array of spatial light modulators according to an embodiment of the present invention.

FIG. 3 is a simplified perspective illustration of an array of spatial light modulators according to an embodiment of the present invention. As illustrated in FIG. 3, a number of micro-mirrors 310 are arranged in a spatial pattern to form a two-dimensional array. The micro-mirrors, coupled to the mirror spacer layer 312 and supported by the standoff structures 314 as described above, are laterally separated from the standoff structures/spacer structure by air gaps 320. For purposes of clarity, FIG. 3 provides an illustration in which portions of the spatial light modulator are omitted as a function of position to illustrate the three-dimensional nature of the spatial light modulator according to embodiments of the present invention.

Although embodiments of the present invention have been discussed in relation to the spatial light modulator architecture illustrated in FIGS. 1 and 3, this is not required by the present invention. In some embodiments, alternative spatial light modulator architectures are utilized. Merely by way of example, a spatial light modulator architecture as described in U.S. patent application Ser. No. 11/143363 and U.S. patent application Ser. No. 11/143371, filed Jun. 1, 2005, and commonly owned and incorporated by reference for all purposes, may be provided according to embodiments of the present invention. These applications describe a spatial light modulator architecture utilizing an alternative standoff structure. In an embodiment utilizing the spatial light modulator architecture described in these applications, the contact structures may be formed on, for example, the electrode substrate during the fabrication process.

Figure 4:
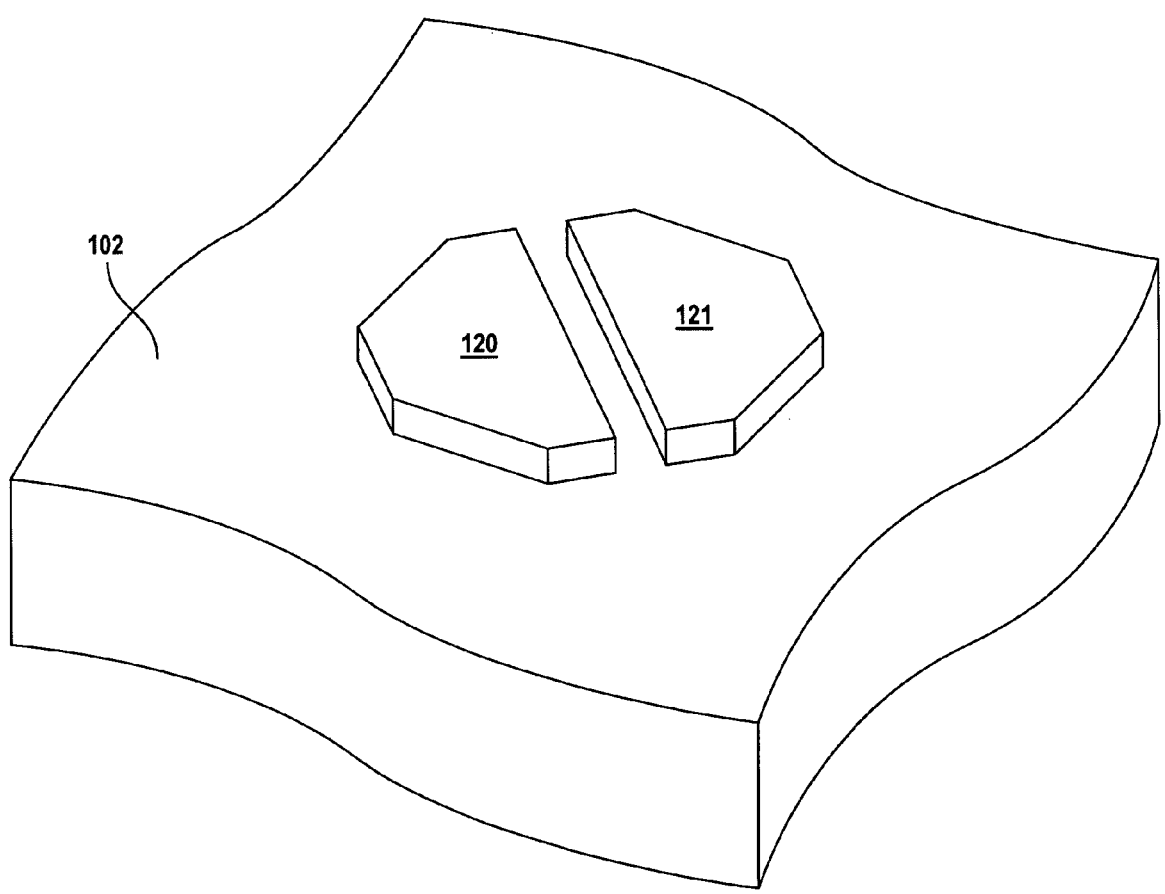
FIGS. 4–9 are simplified perspective illustrations of a process flow for fabricating a spatial light modulator according to an embodiment of the present invention.

FIGS. 4–9 are simplified perspective illustrations of a process flow for fabricating a spatial light modulator according to an embodiment of the present invention. First substrate 102 includes a number of layers, of which only a selected few are illustrated in FIG. 4. One layer illustrated in the figures includes electrodes 120 and 121. The electrodes are typically formed by the deposition and/or patterning of one or more metal layers. In one embodiment, electrode 120 is an electrode adapted to control the tilt of a micro-mirror in a first direction and electrode 121 is an electrode adapted to control the tilt of the micro-mirror in a second direction opposite to the first direction. As will be evident to one of skill in the art, additional metal, insulator, and via layers as well as other devices are typically fabricated on substrate 102. In some embodiments of the present invention, these additional layers and devices include CMOS circuitry fabricated in processing steps prior to the formation of the electrodes and utilized to drive the electrodes. In a particular embodiment, these layers, along with the layer including the electrodes are fabricated using standard CMOS processes.

Additional details of the fabrication processes for the first substrate and the formation of CMOS circuitry are provided in co-pending and commonly owned U.S. patent application Ser. No. 10/756,923, filed Jan. 13, 2004, which is incorporated by reference for all purposes.

Figure 5:
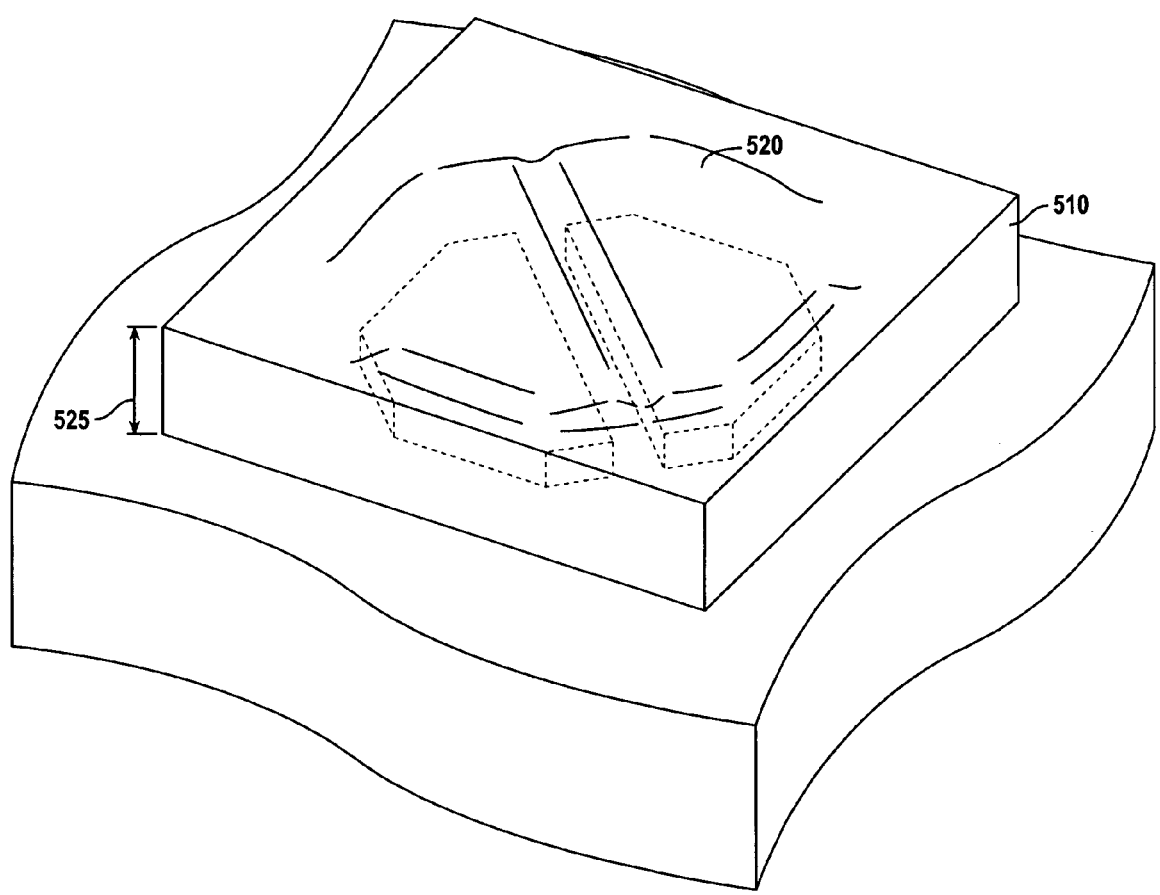

In FIG. 5, a process of forming a standoff layer 510 is illustrated. As described more fully below, standoff structures, including contact structures are fabricated from layer 510, sometimes referred to as a standoff layer. In an exemplary embodiment, layer 510 is fabricated from deposited dielectric material, for example, silicon oxide ($Si_xO_y$), but this is not required by the present invention. Other suitable materials may be used within the scope of the present invention. For example, layer 510 may be fabricated from silicon nitride ($Si_xN_y$), silicon oxynitride (SiON), combinations of these materials with each other and silicon oxide, and the like. Moreover, polysilicon material, including amorphous polysilicon, is utilized in yet another alternative embodiment according to the present invention. Materials with suitable characteristics, including good adhesion to substrate 102 and mechanical rigidity, are acceptable substitutes for $Si_xO_y$ and other such materials.

Moreover, in some embodiments of the present invention, the process used to deposit the layer or layers from which the standoff structures are fabricated is performed in light of the structures present on the first substrate. For example, some CMOS circuitry may be adversely impacted by performing high temperature deposition processes, as these high temperature deposition processes may damage metals or result in diffusion of junctions associated with the CMOS circuitry. Thus, in a particular embodiment of the present invention, low temperature deposition, patterning, and etching processes, such as processes performed at temperatures of less than 500° C., are used to form the layer from which the standoff structures are fabricated. In another specific embodiment, deposition, patterning, and etching processes performed at less than 400° C., are used to form the layer from which the standoff structures are fabricated. For example, a low temperature plasma enhanced chemical vapor deposition (PECVD) process is used in one embodiment to deposit an oxide and form the dielectric layer 510. Alternative embodiments employ atmospheric or low pressure chemical vapor deposition (CVD) processes to form the dielectric layer.

Preferably, the thickness of layer 510 measured across the first substrate is greater than a predetermined thickness. As illustrated in FIG. 5, the thickness of the layer is not uniform, but the minimum thickness of layer is greater than the height of the electrodes. In a particular deposition process, such as that illustrated in FIG. 5, the patterned nature of the electrodes results in the thickness of layer 510 varying as a function of lateral position, producing an upper surface 520 that is not entirely flat. In FIG. 5, this surface is illustrated by the broken lines. In some alternative embodiments according to the present invention, a deposition process produces a layer with a uniform upper surface, but this is not required by the present invention. In a specific embodiment, the thickness 525 of layer 510 is about 2.5 µm. In other embodiments, the thickness ranges from about 2.0 µm to about 3.0 µm. Of course, the thickness will depend on the particular applications.

To planarize the upper surface 520 of the layer 510, a chemical mechanical polishing (CMP) step is performed in an embodiment of the present invention. The results produced by the CMP process are illustrated by upper surface 610 in FIG. 6. After the CMP process, the thickness 615 of layer 610 is a predetermined thickness. Standoff material present above surface 610 is removed during the CMP process, resulting in a highly polished and planaraized. In a particular embodiment, the root-mean-square (RMS) roughness of the planarized surface 610 is less than or equal to about 5 Å. As will be described below, the extremely smooth surface produced during the CMP process facilitates bonding of the mirror substrate to the first substrate. In embodiments according to the present invention, the height 615 of the standoff structure after the CMP process is about 1.6 µm. Alternatively, the height ranges from about 1.2 µm to about 2.0 µm in other embodiments. Of course, the height will depend upon the particular applications.

Figure 7:
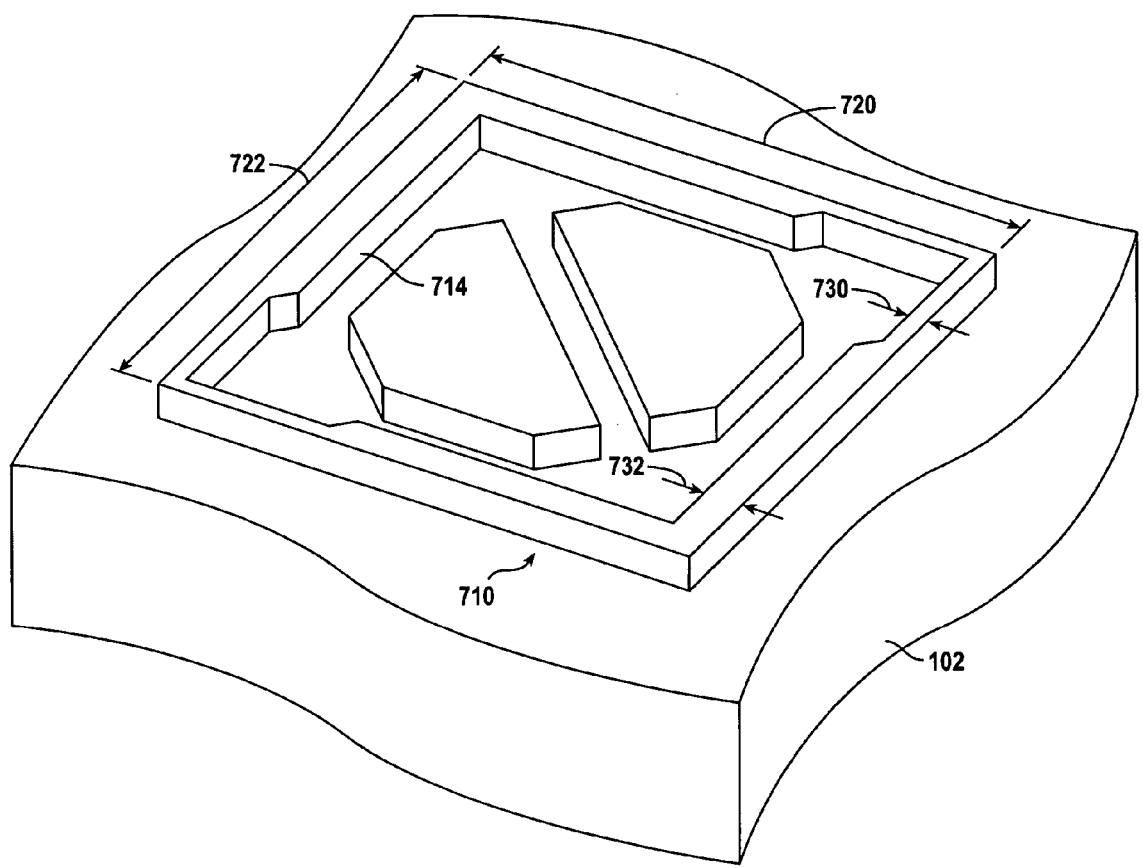

FIG. 7 illustrates the formation of standoff structures with integrated contact pads from layer 605. In some embodiments, a photoresist layer (not shown) is deposited and patterned to form an etch mask on the surface of the layer 605. As will be evident to one of ordinary skill in the art, photoresist may be used as a masking layer in the standoff structure formation process or for the formation of a separate masking layer, which is subsequently utilized to form the standoff structures. The photolithography process is well known and as will be evident to one of ordinary skill in the art, the dimensions of the etch mask may be tightly controlled during photolithography. The etch mask may be formed from any suitable material that is resistant to the etching process used to etch the standoff material. In a specific embodiment, an etch mask of metal such as Al or TiN is utilized.

Figure 6:
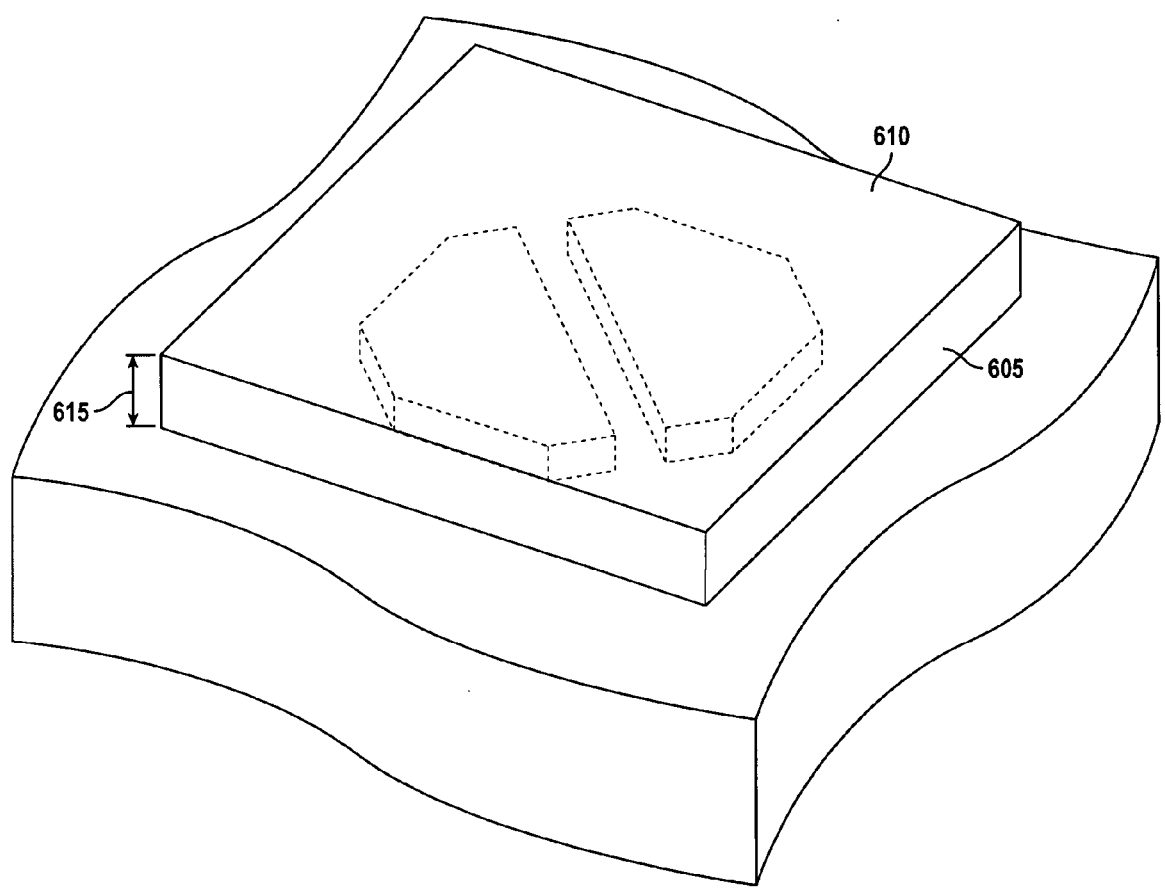

FIG. 7 illustrates substrate 102 and patterned standoff regions 710 with integrated contact pads 714 after an etch process. For purposes of clarity, patterned standoff regions 710 are not illustrated with the same thickness as illustrated in FIG. 6. As illustrated in FIG. 7, portions of the standoff layer 605 have been removed during the etch process, resulting in the formation of standoff regions 710. As will be appreciated by reference to FIG. 3, the standoff structures form a waffle-pack pattern in two dimensions, providing for an array of spatial light modulators. The lateral dimensions of the standoff regions 710 are a function of the geometry of the etch mask and the etch process. As illustrated in the figure, the center to center distance between opposite sides of the standoff region along line 720 is about 13.5 µm. For micro-mirrors with a square shape, the center to center distance 722 is the same. Of course, for rectangular micro-mirrors, the spacing in perpendicular directions may vary. Additionally, the micro-mirrors associated with the electrodes (illustrated by dashed lines) will have dimensions smaller than the center to center distance between opposite sides of the standoff region, permitting the micro-mirrors to move in response to electrical signals present at the electrodes.

As illustrated in FIG. 7, an isotropic etch has been used to define the standoff regions and the integrated contact pads. The etch profile defines vertical walls for the standoff regions with a predetermined thickness. In the illustration, the lateral thickness of the standoff regions is a function of the portion of the spatial light modulator at which the lateral thickness is measured. In an embodiment, the thickness 730 of the portion of the standoff structure near the end of the mirror plate is about 0.5 µm. In other embodiments, the thickness 730 varies from about 0.25 µm to about 1 µm.

The lateral thickness 732 of the standoff structure in portions adjacent the contact pad structure will be greater than that near the end of the mirror plate. In an embodiment, the thickness 732 of the portion of the standoff structure adjacent the contact pad structure is about 1.2 µm. In other embodiments, the thickness 732 varies from about 0.8 µm to about 1.6 µm.

In an alternative embodiment, an etch process that terminates at the upper surface of the electrodes is used that results in simultaneous exposure of the electrodes and passivation of the surface of the substrate 105. In yet another embodiment, the etching process is terminated prior to exposure of the electrode layer, enabling the standoff layer 605 to not only provide mechanical support in the form of standoff regions 710, but additional passivation benefits to the electrodes on the first substrate.

As discussed above, in some embodiments of the present invention, the processes used to deposit, pattern, and etch the layer or layers from which the standoff structures are fabricated are performed at low temperatures. For example, these processing steps may be performed with a view to the structures present on the device substrate prior to the formation of the standoff structures, such as CMOS circuitry. Since some CMOS circuitry may be adversely impacted by performing high temperature deposition processes, which may damage metals coupling CMOS transistors or result in diffusion of junctions associated with the CMOS circuitry, low temperature deposition processes are utilized according to some embodiments of the present invention. Moreover, in a particular embodiment of the present invention, low temperature deposition, patterning, and etching processes, such as processes performed at temperatures of less than 500° C., are used to form the layer or layers from which the standoff structures are fabricated. In another specific embodiment, deposition, patterning, and etching processes performed at less than 400° C., are used to form the layer from which the standoff structures are fabricated. One of ordinary skill in the art would recognize many variations, modifications, and alternatives within the scope of low temperature processes.

The geometry of the standoff structures including the contact structures, is selected, as discussed above, to provide a number of benefits. The thickness of the various layers, measured both vertically and laterally, the shapes of the particular features, the distances between features, for example, the standoff structures and the electrodes, and the like, are selected according to design parameters in various embodiments according to embodiments of the present invention. One of ordinary skill in the art would recognize many variations, modifications, and alternatives.

Figure 8:
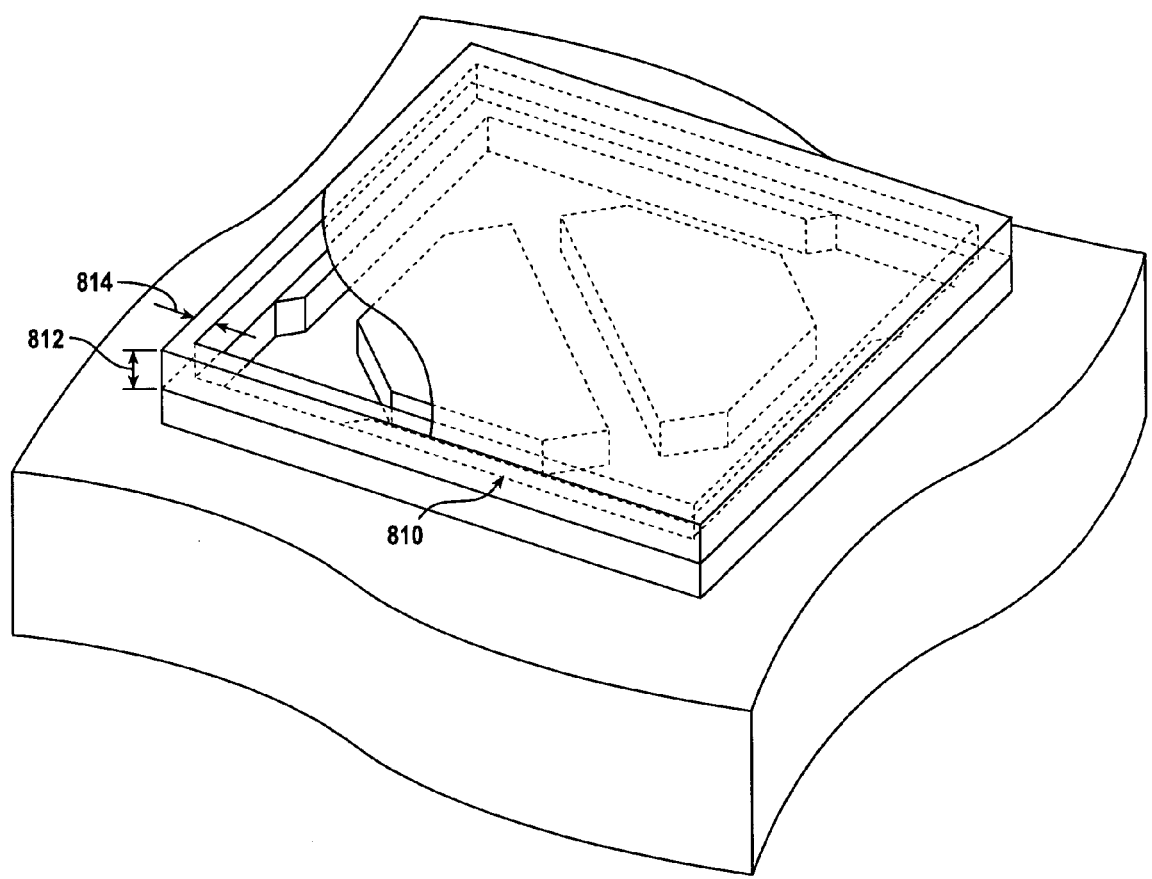

FIG. 8 illustrates a substrate bonding process in which the first substrate is joined to the mirror substrate. In the embodiment illustrated in FIG. 8, the spacer support frame 810 has already been formed on the mirror substrate. The spacer support frame 810, in combination with the standoff structure 710, separates the mirror layer 108 from the electrodes and addressing circuitry so that the mirror plates may deflect downward without contacting the electrodes and other circuitry below. The spacer support frame 810 includes spacer walls in an embodiment, which are typically not physically separate components from the rest of the spacer support frame. These walls help define the height of the spacer support frame. The height 812 of the spacers is chosen based on the desired separation between the mirror plates 114 and 116 and the electrodes, considering the presence of the standoff structure and the topographic design of the electrodes. A larger height allows more deflection of the mirror plate, and a higher maximum deflection angle. A larger deflection angle provides a better contrast ratio in some applications.

The spacer support frame 810 also provides support for the flexible member (e.g., hinge) and spaces the mirror plate laterally from other mirror plates in a mirror array as illustrated in FIG. 3. The spacer support frame has a spacer wall width 814, which, when added to a gap between the mirror plate and the support frame, is substantially equal to the distance between adjacent mirror plates of adjacent micro mirrors. Merely by way of example, in a specific embodiment, the spacer wall width 814 is about 0.6 µm. In alternative embodiments, the spacer wall width is about 0.04 µm to about 0.8 µm, depending on the particular applications. As illustrated in FIG. 8, the lateral width of the spacer wall and the lateral width of the standoff structure, in the regions without the contact structures, is approximately equal, but this is not required by the present invention. In alternative embodiments, the width of the spacer wall differs from the width of the standoff structure, with the width of the spacer wall less than the width of the standoff structure in a particular embodiment. As will be evident to one of ordinary skill in the art, a decrease in the spacer wall width will increase the fill factor of the mirror array.

In a specific embodiment according to the present invention, the spacer structure and mirror layer are fabricated by a semiconductor processing technique as more fully described in previously referenced U.S. patent application Ser. No. 10/756,923. In an embodiment, a first mask is generated to define portions of the mirror substrate that will be etched from one side of the mirror substrate to form the cavities on the underside of the mirror substrate bordered by the spacer support frames. Standard techniques, such as photolithography, can be used to generate the mask on the mirror substrate. In a preferred embodiment, the mirror layer, flexible members, and spacer structure are formed from a single material, such as single crystal silicon. Thus, in one preferred embodiment, the mirror substrate is a wafer or substrate of single crystal silicon. Note that typically, multiple arrays of spatial light modulators are fabricated on a single substrate, to be separated later. The structures fabricated to create the array of spatial light modulators are typically larger than the features used in CMOS circuitry, so it is relatively easy to form the micro mirror array structures using known techniques for fabricating CMOS circuitry.

After the mask is generated, in a preferred embodiment, the mirror substrate is processed to form the cavities beneath the mirror layer. In other words, a "well" is formed in the mirror substrate aligned with a location for every micro mirror. In an embodiment, the lower surface of the mirror substrate is etched in a reactive ion etch chamber flowing with $SF_6$, HBr, and oxygen gases at flow rates of 100 sccm, 50 sccm, and 10 sccm, respectively. The operating pressure is in the range of 10 to 50 mTorr, the bias power is 60 W, and the source power is 300 W. In another embodiment, the mirror substrate is etched in a reactive ion etch chamber flowing with $Cl_2$, HBr, and oxygen gases at flow rates of 100 sccm, 50 sccm, and 10 sccm, respectively. In these embodiments, the etch processes stop when the height of the spacer structure, measured normal to the mirror substrate is about 1.5 µm. In alternative embodiments, the height of the spacer structure ranges from about 1.2 µm to about 1.8 µm. The height will depend on the particular applications and the height of the standoff structure formed on the firs substrate. Generally, this height is typically measured using in-situ etch depth monitoring, such as in-situ optical interferometer techniques, or by timing the etch rate.

In another embodiment, the spacer structures are formed in the lower surface of the mirror substrate by an anisotropic reactive ion etch process. The substrate is placed in a reaction chamber. $SF_6$, HBr, and oxygen gases are introduced into the reaction chamber at a total flow rate of 100 sccm, 50 sccm, and 20 sccm, respectively. A bias power setting of 50 W and a source power of 150 W are used at a pressure of 50 mTorr for approximately 5 minutes. The substrate is then cooled with a backside helium gas flow of 20 sccm at a pressure of 1 mTorr. In a particular embodiment, the etch processes stop when the height of the spacer structure, measured perpendicular to the mirror plates is about 1.5 µm. Generally, this height is measured using in-situ etch depth monitoring, such as in-situ optical interferometer techniques, or by timing the etch rate.

Although the mirror substrate is illustrated in FIG. 8 as only consisting of the mirror layer and the spacer structure, it should be noted that additional layers are provided in some embodiments of the present invention. For example, in a particular embodiment, a composite substrate is utilized for the mirror substrate during initial processing steps. In this embodiment, the mirror substrate comprises a multilayer substrate structure with a number of layers, for example, a silicon-on-insulator (SOI) substrate including a layer of silicon, a layer of buried oxide, and an additional layer of silicon. In a particular embodiment, the silicon layers are single crystal silicon layers, although this is not required by the present invention. Alternative embodiments according to the present invention include layers of polysilicon, amorphous silicon, and other suitable substrate layers. The buried oxide layer serves as an etch stop in one embodiment of the present invention, in which substrate is thinned after substrate bonding processes by removal of some layers.

The first substrate and the mirror substrate are aligned so that the electrodes on the first substrate are in the proper position to control the deflection of the micro-mirrors in the mirror substrate. In a specific embodiment, the two substrates are optically aligned using double focusing microscopes by aligning a pattern on the first substrate with a pattern on the second substrate, and the two substrates are bonded together by low temperature bonding methods such as anodic, eutectic, fusion, covalent, glass frit, and/or other bonding techniques. In embodiments in which standoff region 710 and spacer structure 810 are silicon oxide and silicon, respectively, room temperature covalent bonding techniques are used to form a bond between the substrates. Of course, one of ordinary skill in the art would recognize many variations, modifications, and alternatives.

In alternative embodiments, bonding of the two substrates is performed using a variety of techniques. In a specific embodiment, the bonding occurs using a room temperature covalent bonding process. Each of the bonding surfaces is cleaned and activated, for example, by plasma activation or by wet processing. The activated surfaces are brought in contact with each other to cause a sticking action. In some bonding processes, mechanical force is provided on each substrate structure to press the bonding surfaces together. The bonding surface of the layer from which standoff structures are formed is polished by a CMP process in one embodiment while the bonding surface of the mirror spacer structure is polished as well, providing an extremely smooth surface that is conducive to covalent bonding processes. Of course, one of ordinary skill in the art would recognize many other variations, modifications, and alternatives.

In embodiments in which a composite substrate structure is utilized for the mirror substrate, upper layers of the mirror substrate are removed in one or more subsequent processing steps. Such processing steps may include CMP, grinding, etch back, any combination of these, and the like. In one application, the buried oxide layer present in the composite substrate structure provides an etch stop layer during the thinning process. Plasma ashing is used in some embodiments to remove the buried oxide layer and expose the mirror layer 108. After the thinning process, the mirror layer is exposed, making the layer available for the formation of micro-mirrors as described below.

Figure 9:
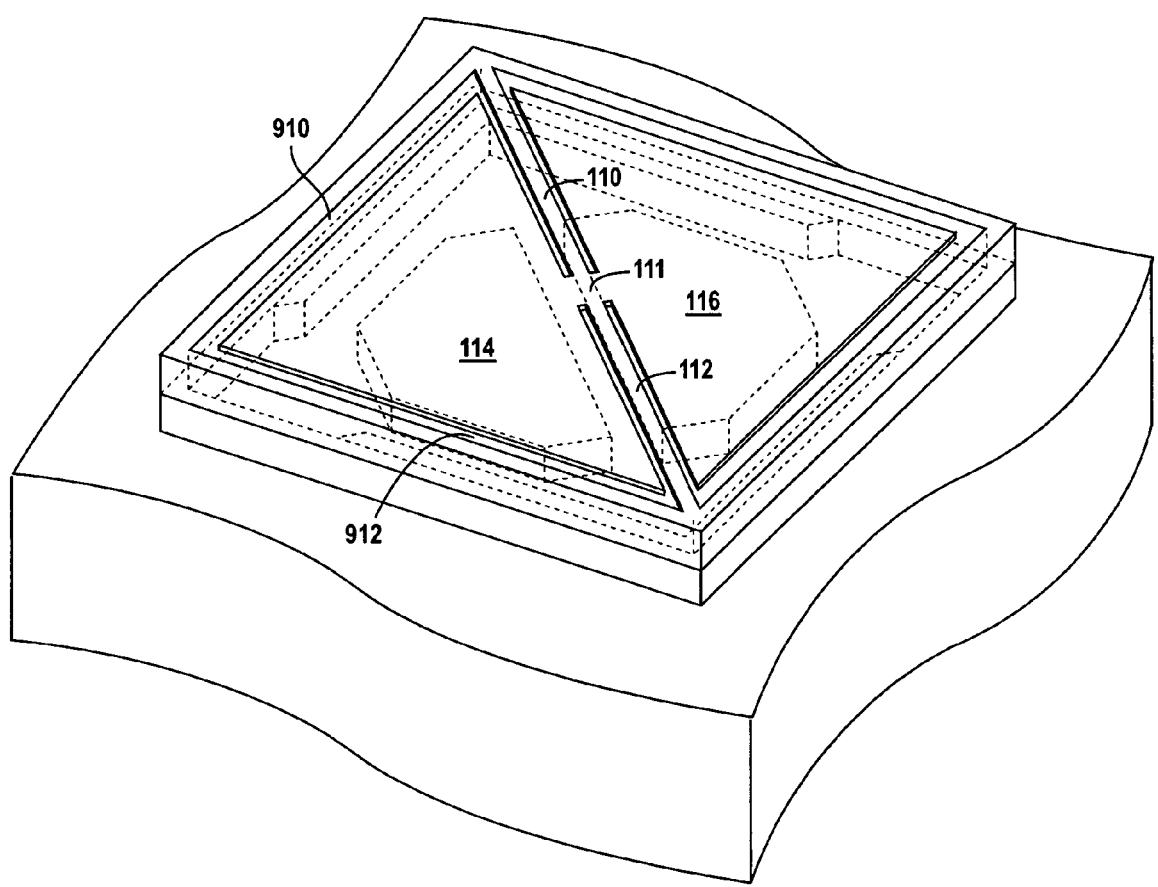

FIG. 9 illustrates the formation of mirror structures using semiconductor processing techniques. Mirror plates 114 and 116 have been separated from portions of the mirror layer coupled to the spacer structure by the formation of etched openings 910 and 912. Connector 111 is provided at the center of the mirror, coupled to flexible members 110 and 112 and the mirror plates.

In some embodiments, a reflective layer is formed on the surface of the mirror plates and flexible member. This may be accompanied by the polishing the mirror layer so that the surface of the layer is reflective. It is also possible to deposit a layer of a reflective material on the mirror layer to create a reflective surface. Other methods to create a reflective surface may also be used. In a particular embodiment, a reflective layer of aluminum is deposited. The thinned surface of the first substrate, in some cases as thin as 0.2 µm, is coated with approximately 100 Å of a titanium seed thin film. Then an approximately 300 Å thick layer of aluminum is deposited to form a reflective layer with a reflectivity above 95% over much of the visible optical spectrum.

In some embodiments, the process of forming the mirrors and depositing the reflective layer is reversed, with the reflective layer formed prior to the separation of the mirror plates and hinges. One of ordinary skill in the art would recognize many variations, modifications, and alternatives.

Figure 10:
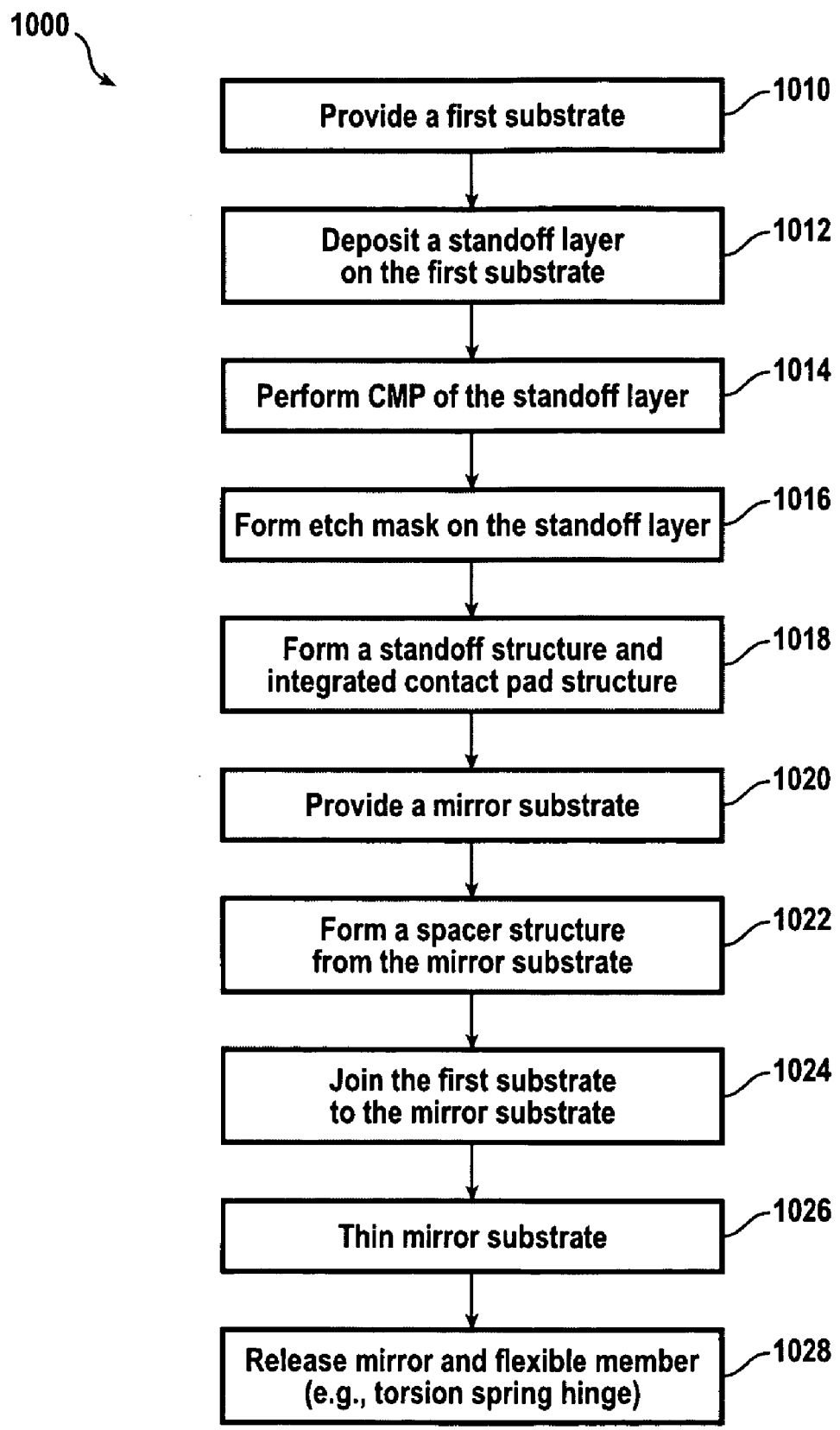
FIG. 10 is simplified flowchart illustrating a method of fabricating a spatial light modulator according to an embodiment of the present invention.

FIG. 10 is simplified flowchart illustrating a method 1000 of fabricating a spatial light modulator according to an embodiment of the present invention. A first substrate is provided in step 1010. In a specific embodiment according to the present invention, the first substrate is an electrode substrate comprising a plurality of electrically activated electrodes, for example CMOS electrodes. Additional layers other than electrode layers are formed in some embodiments of the present invention, with the electrode layer being the last layer defined by the processing steps. The geometry and structure of the electrodes is selected to correlate with mirrors fabricated in at least one layer of a mirror substrate.

In step 1012, a standoff layer is deposited on the surface of the first substrate including the plurality of electrodes. In a specific embodiment, the standoff layer is a silicon oxide layer as described above, although this is not required by the present invention. Other standoff layer materials, including silicon nitride, silicon oxynitride, amorphous silicon, polysilicon, combinations of these layers, and the like are utilized in alternative embodiments. The thickness of the standoff layer is a predetermined thickness. In the embodiment illustrated by the process flow in FIG. 10, the thickness of the standoff layer is selected to be greater than the eventual height of the standoff structures. In this embodiment, the thickness of the standoff layer is about 2.0 µm.

In step 1014, a CMP process is performed to reduce the thickness of the as deposited standoff layer and produce a uniform upper surface for the standoff layer. In one embodiment, the RMS roughness of the upper surface of the standoff layer is about 5 Å after the CMP process is completed. As described above, the CMP process results in extremely smooth bonding surfaces of the standoff structure, enhancing the bond formed in later steps. In a specific embodiment, the CMP process removes an upper portion of the standoff layer, resulting in a standoff layer that is about 1.9 µm in thickness.

In step 1016, an etch mask, for example, a photoresist layer, is formed on the standoff layer. In an embodiment, a photoresist layer is deposited and patterned in step 1016 and subsequent processing steps are used to form an etch mask. The formation of an etch mask (either of photoresist or other material) will be evident to those of skill in the art. In step 1018, the etch mask is used to etch the standoff layer to form standoff structure and the integrated contact pad structure. The etch mask protects the polished surfaces of the standoff structures during the etch process. In a particular embodiment, the etch process is terminated when the electrode layer is exposed. In other embodiments, the etch process is terminated prior to exposure of the electrodes present on the device substrate, providing a passivation layer for the electrodes.

The lateral shape of the standoff structure and integrated contact pad structure is a function of the etch process used in step 1018 and is selected to provide for a desired contact area between the mirror plates and the contact pads. Moreover, the position of the contact pads is selected to reduce the stiction torque present in the flexible member compared to the torque resulting from contact points near the end region of the mirror plate. In a particular embodiment, the materials selected for the contact pads are selected for their stiction properties, mechanical rigidity, and other properties. As previously discussed, the position of the contact pads are selected to provide a contact area at the intersection of an edge portion of the mirror plates when the mirror is in an activated position. In the activated position, the end region of the mirror plates is maintained free from contact with the first substrate and structures associated with the first substrate.

In step 1020, a mirror substrate having a mirror layer is provided. As described previously, in a specific embodiment, the mirror substrate is a multi-layer substrate structure, such as an SOI substrate. The dimensions of the layers making up the multi-layer substrate are selected to satisfy various design constraints. For example, in one embodiment of the present invention, a silicon layer is provided that is thick enough to form a mirror layer integrated with a standoff structure. The surfaces of the SOI substrate are polished in some embodiments to facilitate substrate bonding processes in subsequent processing steps.

Step 1022 includes forming a spacer structure from the mirror substrate. In some embodiments, the spacer structure is formed by an etching process. In a particular embodiment, a surface of the mirror substrate is masked and etched to form spacer structures extending from the mirror layer of the mirror substrate. Typically, a mask is generated to define the portion of the mirror substrate that will be etched to form the spacer structures. Standard techniques, such as photolithography, can be used to generate the mask on the mirror substrate. As mentioned previously, in an embodiment according to the present invention, the micro-mirrors and spacer structures are formed from a substrate layer comprising a single material, such as single crystal silicon. The structures fabricated to create the micro-mirrors and spacer structures are typically larger than the features used in CMOS circuitry, so it is relatively easy to form the micro-mirrors and spacer structures using known techniques for fabricating CMOS circuitry.

After the mask is generated, the mirror substrate is anisotropically etched in an embodiment to form the spacer structures. Other methods besides an anisotropic etch may also be used to form the spacer structures, such as a wet etch or a plasma etch. One of ordinary skill in the art would recognize many variations, modifications, and alternatives.

Because the unetched surface of the spacer structure is masked during fabrication, this surface provides a bonding surface for subsequent substrate bonding processes.

In step 1024, the standoff structures formed on the first substrate are joined to the spacer structures coupled to the mirror layer in a substrate bonding process. As mentioned previously, in a preferred embodiment, a number of arrays of spatial light modulators are provided on a wafer or substrate, thereby providing a number of arrays to be separated in later processing and packaging steps.

During the substrate bonding process, the first substrate and the mirror substrate are aligned so that the electrodes on the first substrate are in a proper position to control the deflection of the micro-mirrors formed in subsequent processing steps on the mirror substrate. In an embodiment, the two substrates are optically aligned using double focusing microscopes by aligning a pattern on the first substrate with a pattern on the second substrate and the two substrates are bonded together by low temperature (e.g., room temperature) bonding methods such as anodic, covalent, or eutectic bonding. There are many possible alternate embodiments to the bonding process illustrated by step 1024. For example, thermoplastics or dielectric spin glass bonding materials may be used so that substrates are bonded thermo-mechanically.

After bonding the substrates together, the surface of the mirror substrate opposite the spacer structures is thinned to a predetermined thickness in step 1026. In embodiments in which the mirror substrate is a composite substrate structure, layers other than the mirror layer are removed, typically by grinding, etching, polishing, and/or other thinning processes. For example, in some embodiments, the thickness achieved by mechanical grinding is approximately 5 µm. The mirror substrate is then planarized by using a wet or dry silicon etch/oxide etch process or a CMP process to the thickness desired for the micro-mirror layer. In a particular silicon etch/oxide etch process, the remaining portion of the first silicon layer of the SOI substrate is removed, terminating at the oxide layer of the SOI substrate. As will be evident to one of skill in the art, highly selective etches, with a silicon:oxide etch selectivity as high as 50:1 may be utilized to preferentially remove the silicon layer and stop at the oxide layer. The oxide is subsequently removed in some embodiments to expose the second silicon layer, from which the mirrors are fabricated. In an embodiment according to the present invention, the desired thickness for the micro-mirror layer is less than approximately 0.5 µm. In a specific embodiment, this desired thickness is 0.3 µm.

In step 1028, the mirror substrate is masked and processed to release a portion of the mirror substrate to form a mirror coupled to a flexible member (e.g., a torsion beam or torsion spring hinge) that is coplanar with the mirrors. As illustrated in FIG. 9, in an embodiment, a high-aspect-ratio anisotropic etching process is used to define the mirror plates 114 and 116, the flexible member with torsion beams 110 and 112, and the connector 111. After the mirror release process, the mirrors are free to rotate about the longitudinal axis of the flexible member. In some embodiments, a reflective layer is deposited before or after the mirror release step.

Although the embodiments discussed above have utilized a standoff layer formed on the first substrate and a spacer structure formed from the mirror substrate, this is not required by the present invention. In an alternative embodiment, the layer separating the mirror layer from the first substrate consists essentially of the structure formed (e.g., deposited and patterned) on the first substrate and no spacer layer is provided on the mirror substrate. These alternative embodiments utilizing an integrated spatial light modulator architecture are described more fully in U.S. patent application Ser. No. 11/028,946, filed Jan. 3, 2005, commonly owned, and hereby incorporated by reference for all purposes. As will be evident to one of skill in the art, the alignment tolerances for an integrated structure of this type will be relaxed, simplifying a portion of the fabrication process.

At the same time, methods and systems fabricated utilizing such an integrated structure may require a two-step patterning and etching process to form the standoff structure and contact pads. Merely by way of example, in a particular embodiment, a first patterning and etching process is utilized to form the upper portions of the standoff structure. In a subsequent patterning and etching process, the contact pad structures are defined along with the lower portion of the standoff structures. Alternatively, a two-step deposition and patterning process may also be utilized. For example, in an alternative embodiment, a first layer is deposited and patterned to form a lower section of the standoff structure with the integrated contact structure. A second deposition and patterning process is utilized to form an upper portion of the standoff structure. Etch stop layers may be integrated into these process flows as will be evident to one of ordinary skill in the art. Moreover, the widths of the portions of the standoff structure may vary, with the upper portion, for example, being narrower than the lower portion.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A spatial light modulator comprising:
   a first substrate;
   a standoff structure coupled to the first substrate;
   a mirror structure coupled to the standoff structure, the mirror structure comprising:
      a mirror body comprising at least one edge region and at least one end region;
      a reflective layer coupled to the mirror body; and
      a flexible member coplanar with the mirror body, wherein the mirror structure rotates about the flexible member to an activated position, the at least one edge region of the mirror body making contact with the standoff structure in the activated position while maintaining the at least one end region free from contact with the first substrate.

2. The spatial light modulator of claim 1 wherein the first substrate is an electrode substrate including a plurality of electrodes adapted to receive an electrical activation signal.

3. The spatial light modulator of claim 1 wherein the standoff structure comprises a first portion coupled to the first substrate and a second portion coupled to the mirror structure.

4. The spatial light modulator of claim 3 wherein the first portion is fabricated from a dielectric layer.

5. The spatial light modulator of claim 3 wherein the second portion and the mirror structure are fabricated from a single piece of material.

6. The spatial light modulator of claim 5 wherein the single piece of material is a silicon substrate.

7. The spatial light modulator of claim 1 wherein the standoff structure comprises a contact structure coupled to the first substrate.

8. The spatial light modulator of claim 7 wherein the contact structure is fabricated from a dielectric layer.

9. The spatial light modulator of claim 8 wherein the dielectric layer is fabricated from a layer of silicon oxide.

10. The spatial light modulator of claim 1 wherein the mirror body makes contact with the contact structure at a plurality of contact points, each of the contact points an equal distance from the at least one end region of the mirror body.

11. The spatial light modulator of claim 1 wherein the mirror body makes contact with the contact structure at at least one contact point, a minimum distance from the flexible member to the at least one contact point being less than one half a diagonal distance across the mirror structure measured perpendicular to the flexible member.

12. The spatial light modulator of claim 1 wherein the standoff structure comprises a contact edge that is tapered to provide a contact point at which the mirror body makes physical contact with the contact structure.

13. The spatial light modulator of claim 1 wherein the contact structure comprises a contact edge that is tapered along a line substantially perpendicular to a diagonal of the mirror structure.

14. An array of spatial light modulators, the array comprising:
   an electrode substrate;
   a standoff structure with integrated contact pads coupled to the electrode substrate, the standoff structure including a plurality of annular recesses;
   a first set of electrodes disposed within a first annular recess of the standoff structure;
   a first micro-mirror associated with the first set of electrodes, coupled to the standoff structure, and adapted to rotate about a first hinge to an activated position, the first micro-mirror comprising at least one first edge region and at least one first end region, wherein the at least one first edge region makes contact with at least a first contact pad in the activated position while maintaining the at least one first end region free from contact with the electrode substrate;
   a second set of electrodes disposed within a second annular recess of the standoff structure; and
   a second micro-mirror associated with the second set of electrodes, coupled to the standoff structure, and adapted to rotate about a second hinge to an activated position, the second micro-mirror comprising at least one second edge region and at least one second end region, wherein the at least one second edge region makes contact with at least a second contact pad in the activated position while maintaining the at least one second end region free from contact with the electrode substrate.

15. The array of claim 14 wherein:
   the first micro-mirror further comprises a third edge region, wherein the third edge region makes contact with a third contact pad in the activated position while maintaining the at least one first end region free from contact with the electrode substrate, and
   wherein the second micro-mirror further comprises a fourth edge region, wherein the fourth edge region makes contact with a fourth contact pad in the activated position while maintaining the at least one second end region free from contact with the electrode substrate.

* * * * *